F. D. STONER.
AEROPLANE.
APPLICATION FILED JAN. 24, 1919.
1,365,562.
Patented Jan. 11, 1921.
2 SHEETS—SHEET 2.
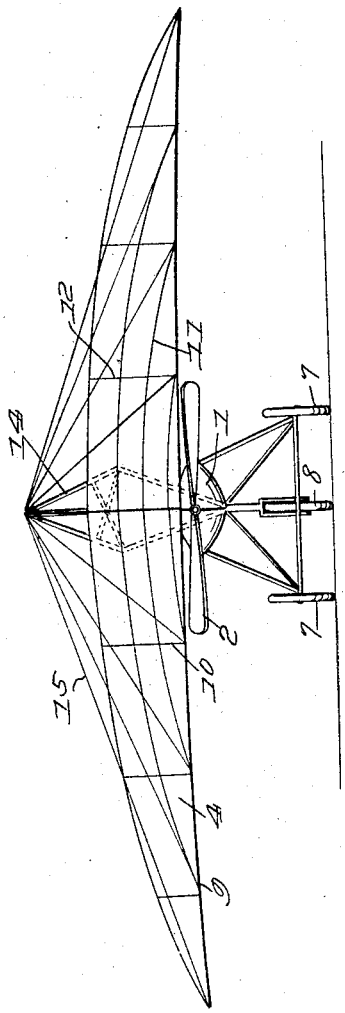
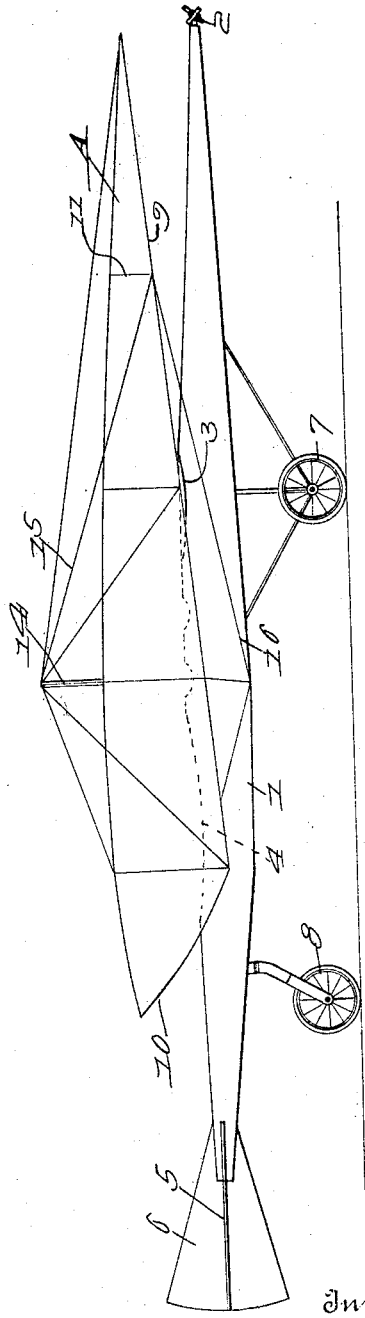
Inventor
Forest D. Stoner,
By
Attorney

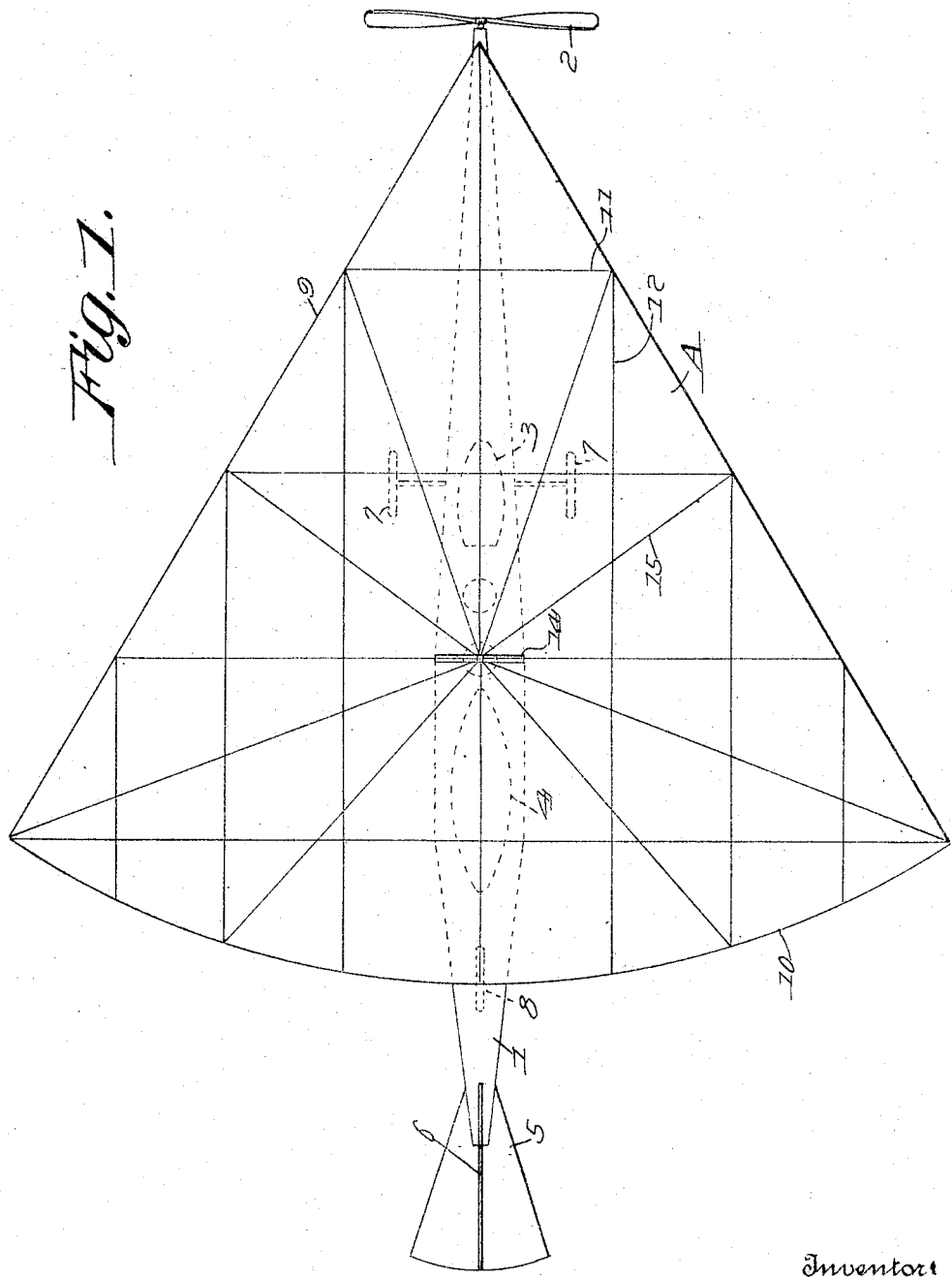

UNITED STATES PATENT OFFICE.

FOREST D. STONER, OF VALPARAISO, INDIANA.

AEROPLANE.

1,365,562.   Specification of Letters Patent.   Patented Jan. 11, 1921.

Application filed January 24, 1919. Serial No. 272,905.

*To all whom it may concern:*

Be it known that I, FOREST D. STONER, a citizen of the United States, residing at Valparaiso, in the county of Porter and State of Indiana, have invented new and useful Improvements in Aeroplanes, of which the following is a specification.

The object of the invention is to provide a new and novel form for aerial craft, the purpose being to provide a plane for monoplane or multiplane machines which will be concavo-convex so that a relatively great sustaining power may be had and so that means may be provided to prevent a sudden fall of the machine in the case of damage or derangement of its propelling machinery.

Further and other objects relating to refinements in design and structural detail appear in the following description wherein the invention is set forth in detail.

As shown and described, a specific embodiment of the invention is adhered to but to this embodiment the invention is not to be restricted. Actual practical application may suggest certain changes or alterations and the right is claimed to make any which do not deviate in scope from the annexed claim.

The same numerals of reference designate the same parts throughout the several figures of the drawings, wherein:

Figure 1 is a top plan view of the aeroplane structure, in accordance with the invention, the particular embodiment shown being on the monoplane type.

Fig. 2 is a front elevational view of the structure of Fig. 1.

Fig. 3 is a side elevational view of the structure of Fig. 1.

As illustrated in the drawings, the invention consists of the plane A in combination with the fuselage 1, the latter being made preferably of the shape of a cigar and carrying at its forward end the propeller 2 designed to be driven by an engine (not shown) carried within the fuselage which is provided with the cockpits 3 and 4 in which respectively the operator and passengers sit.

At the rear end of the fuselage there are carried the horizontal rudder 5 and the rudder 6, these two latter being designed for operation in the usual way by means unnecessary of illustration or description.

Landing means in the form of a forward landing gear 7 and an aft landing gear 8 are provided and attached to the fuselage, the two being a relatively great distance apart and positioned on opposite sides of the longitudinal center of the fuselage.

The fuselage shown is of a shape for use with the provision of the peculiar form of plane and this fuselage is designed to have its center of gravity substantially at its longitudinal center or thereabout.

The plane A, in plan, presents the appearance of a sector of a circle but is bowed longitudinally and transversely so that it becomes in effect the zone of a sphere, the convex side being upwardly disposed away from the fuselage which is swung beneath the plane.

In the present embodiment of the invention the monoplane idea is adhered to but it is obvious that the principle may be applied to machines of the biplane or multiplane type.

The plane A is formed with the diagonally disposed brace rods 9 and the curved brace rod 10, bowed brace rods 11 being connected between the marginal brace rods 9 while brace rods 12, also bowed, are connected between the curved brace rod 10 and the two marginal brace rods 9. A post 14 connects with the fuselage 1 and projects upwardly and downwardly therefrom, the upwardly projecting portion extending through the plane A at a point practically above the center of gravity of the latter, the plane, of course, comprising the brace members aforesaid and a suitable covering element therefor.

A plurality of guy wires 15 connect with the frame of the plane A at the points of juncture between the transverse brace members 11 with the members 9 and the points of juncture between the longitudinal brace members 12 and the curved brace member 10. These guy wires extend to and are attached to the upper extending end of the post 14. Guy wires 16 connect with the frame of the plane at its marginal edges at the same points where the guy wires 15 connect, but the former guy wires extend downwardly and are attached to the post 14 at its lower end. The plane thus being given its shape by the shape of the brace members, as aforesaid, is retained in such shape by the provision of the guy wires and their attendant post.

With the construction of the invention, as shown, all the weight is below the plane, so that gravity tends naturally to hold the machine in the position where the plane is above. The front or peaked end of the plane stands up high enough above the fuselage to allow the propeller to rotate beneath the plane. The peculiar shape of the plane makes for the provision of a machine of relatively great carrying capacity, one that can climb to a high altitude in a relatively short time, one that lessens the liability of turning down side up, and one that can be built of relatively heavy and strong material and yet be securely braced.

The invention having been described, what is claimed as new and useful is:

In an aeroplane, the combination with a cigar-shaped fuselage, of a plane formed with upwardly converging marginal brace rods and a curved rear brace rod connecting the two opposite brace rods, the plane being formed with transversely disposed upwardly bowed brace rods spanning the space between the converging brace rods, to provide a concavo-convex shape for the plane, the fuselage being swung from above the plane whose forward peaked end stands in a plane above the fuselage, the rear part of the plane being disposed adjacent the fuselage and bowed transversely.

In testimony whereof I affix my signature.

FOREST D. STONER.